(12) United States Patent
Uezel et al.

(10) Patent No.: US 11,959,830 B2
(45) Date of Patent: Apr. 16, 2024

(54) INTELLIGENT MEMBRANE SYSTEMS AND METHODS

(71) Applicant: Benecke-Kaliko AG, Hannover (DE)

(72) Inventors: Burak Uezel, Mountain View, CA (US); Antoine Segeral, Winchester, VA (US); Joshua Snyder, Winchester, VA (US)

(73) Assignee: Benecke-Kaliko AG, Hannover (DE)

( * ) Notice: Subject to any disclaimer, the term of this patent is extended or adjusted under 35 U.S.C. 154(b) by 441 days.

(21) Appl. No.: 17/067,827

(22) Filed: Oct. 12, 2020

(65) Prior Publication Data
US 2022/0113214 A1    Apr. 14, 2022

(51) Int. Cl.
*G01M 3/16*    (2006.01)
*G08C 17/02*    (2006.01)
*E04D 13/00*    (2006.01)

(52) U.S. Cl.
CPC .......... *G01M 3/165* (2013.01); *G08C 17/02* (2013.01); *E04D 13/006* (2013.01)

(58) Field of Classification Search
None
See application file for complete search history.

(56) References Cited

U.S. PATENT DOCUMENTS

| 4,598,273 | A | * | 7/1986 | Bryan, Jr. | ............. | E04D 13/006 |
| | | | | | | 73/304 R |
| 5,640,096 | A | * | 6/1997 | Alm | ........................ | G01M 3/16 |
| | | | | | | 73/40 |
| 8,922,379 | B1 | | 12/2014 | Meyer | | |
| 9,945,754 | B2 | | 4/2018 | Lenart | | |
| 10,036,682 | B2 | | 7/2018 | Lenart | | |
| 2010/0274447 | A1 | * | 10/2010 | Stumpf | .................. | G01D 15/00 |
| | | | | | | 73/146 |
| 2017/0205308 | A1 | * | 7/2017 | Wassarman | ............... | E04B 1/92 |
| 2021/0270691 | A1 | * | 9/2021 | Shah | ......................... | E04D 5/10 |
| 2021/0301536 | A1 | * | 9/2021 | Baggs | ..................... | G01M 3/16 |

FOREIGN PATENT DOCUMENTS

| CN | 209388343 U | 9/2019 |
| JP | H09273974 A | 10/1997 |
| WO | 2018223169 A1 | 12/2018 |

OTHER PUBLICATIONS

International Search Report and Written Opinion dated Feb. 1, 2022 of International Application PCT/EP2021/078135 on which this application is based.

* cited by examiner

*Primary Examiner* — Alexander A Mercado
(74) *Attorney, Agent, or Firm* — Gregory Adams; Richard Wolf

(57) ABSTRACT

A leak detection system for a membrane is disclosed. The system includes a non-permeable membrane; a plurality of printed sensors configured to obtain membrane measurements at a plurality of locations of the membrane; and a control circuit.

14 Claims, 3 Drawing Sheets

INTELLIGENT MEMBRANE SYSTEMS AND METHODS

FIELD

The disclosure generally relates to membranes and related functionality.

BACKGROUND

Membranes are typically used in water or liquid containment applications, such as roofs, showers, pools and the like. The membrane operates to prevent the egress or ingress of water by acting as a liquid barrier Membranes can degrade or become damaged over time. For example, a membrane can be punctured by a sharp object, wear out over time and the like. Unfortunately, when the membranes are damaged, liquid can undesirably pass through.

However, it can be difficult to determine if or when a membrane is damaged. Further, it can be difficult to identify if, when or where a membrane is damaged, which is required in order to make a suitable repair.

Current techniques for detecting membrane damage involve performing a manual scan of the entire membrane to visually identify a leak or defect. Not only is this time consuming, it is prone to miss damages and result in insufficient and/or improper membrane repair.

What is needed are techniques to facilitate leak identification and location for membranes and the like.

DETAILED DESCRIPTION

Figure 1:
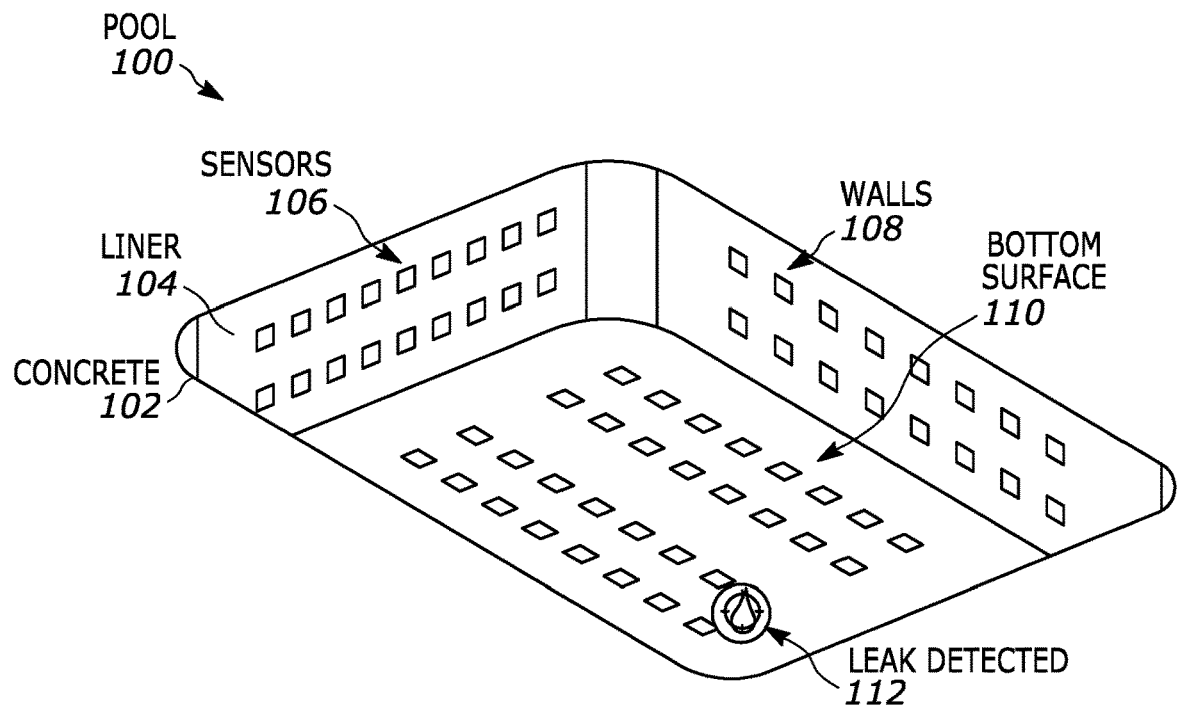
FIG. 1 is a diagram illustrating an intelligent membrane system 100 for a pool in accordance with one or more embodiments.

The following description of the variations is merely illustrative in nature and is in no way intended to limit the scope of the disclosure, its application, or uses. The description is presented herein solely for the purpose of illustrating the various embodiments of the disclosure and should not be construed as a limitation to the scope and applicability of the disclosure. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a value range listed or described as being useful, suitable, or the like, is intended that any and every value within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Examples can include subject matter such as a method, means for performing acts or blocks of the method, at least one machine-readable medium including instructions that, when performed by a machine cause the machine to perform acts of the method or of an apparatus or system for concurrent communication using multiple techniques.

Membranes are used in water or liquid containment applications, such as roofs, showers, pools and the like. The membrane operates to prevent the egress or ingress of water by acting as a liquid barrier.

Membranes can degrade or become damaged over time. For example, a membrane can be punctured by a sharp object or wear out over time. Unfortunately, when the membranes are damaged, liquid can undesirably pass through.

However, it can be difficult to determine if or when a membrane is damaged. Further, it can be difficult to identify where a membrane is damaged, which is required in order to make a suitable repair.

Current techniques involve performing a manual scan of the entire membrane to visually identify a leak or defect. For example, an inspection of a pool membrane requires scuba gear to perform a manual, visual inspection of the entire pool membrane. Not only is this time consuming, it is prone to miss damages and result in insufficient and/or improper membrane repair.

What is needed are techniques to facilitate leak identification and location for membranes and the like.

One or more embodiments are disclosed that include an intelligent membrane that monitors and identifies leaks without requiring a visual inspection and/or other techniques to identify leaks.

FIG. 1 is a diagram illustrating an intelligent membrane system 100 for a pool in accordance with one or more embodiments. It is appreciated that the system 100 is provided for illustrative purposes and that suitable variations are contemplated.

The system 100 includes a membrane 104, a plurality of sensors 106, walls 108 and a bottom surface 110. The system 100 identifies leaks and location of identified leaks.

In this example, the membrane 104 is configured to cover a pool having a suitable shape and formed in concrete or other suitable pool surface 102. However, it is appreciated that the membrane 104 can be utilized for other pool fabrications, including fiberglass and the like. Additionally, it is appreciated that the membrane can be utilized in other suitable applications, such as roofs, shower pans, and the like to identify leaks and locations of identified leaks.

An example of another suitable application is for pool constructions that use steel walls and a vermiculite bottom or floor.

The membrane 104 covers the bottom surface 110 and walls 108 of the pool. The membrane 104 is generally comprised of one or more layers. The membrane 104 is configured as a selective barrier and can be configured to allow some materials/properties to pass while blocking others. For a pool/water application, the membrane 104 is typically configured to block water/liquid, but can also be configured to selectively allow elements and/or chemicals to pass.

In one example, the membrane 104 can comprise a flexible material, such as polyvinyl chloride (PVC), elastomeric materials, rubber, and the like. In another example, the membrane 104 comprises a rigid material. The membrane 104 can be a liner.

The membrane 104 is generally impermeable or not permeable in that it does not permit liquid and/or air to pass through.

The membrane 104 can be attached to one or more other layers that can also be flexible and/or rigid.

The membrane 104 includes a plurality of sensors 106 configured to obtain membrane measurements at a plurality of locations. The sensors 106, in one example, are arranged as a grid along surfaces of the membrane 104, such as the walls 108 and the bottom 110.

A control circuit (not shown) is coupled to the plurality of sensors 106. The control circuit is configured to receive the membrane measurements from the sensors 106. The membrane measurements can include capacitive measurements, resistive measurements, and the like. The control circuit can be configured to determine a plurality of humidity readings based on membrane measurements, such as capacitance measurements. The control circuit is configured to identify one or more leaks based on the plurality of humidity readings and/or membrane measurements. An example of a suitable control circuitry is the control circuitry 402 shown in FIG. 4.

It is appreciated that the control circuit can be configured to receive other types of measurements, such as resistive measurements.

The sensors 106 can include printed, flexible humidity sensors where the sensors obtain membrane measurements at various locations of the membrane 104. The membrane measurements typically correspond to humidity value/reading(s). If the humidity reading varies from a standard value or by a threshold amount, a leak may be present at the location of the sensor. FIG. 1 shows an example, where a sensor has a humidity reading, which indicates a leak detected 112 at the shown location of FIG. 1.

The humidity readings are typically based on temperature and water vapor pressure.

The sensors 106 are connected to the control circuitry. In one example, the connection is by conductive wires woven or formed in the membrane 104. In another example, the connection is by a wireless network, such as Bluetooth, WiFi, Internet of Things (IoT), radio frequency identification (RFID) and the like.

The sensors 106 and/or the control circuitry are powered by a suitable power source. In one example, the suitable power source includes photovoltaic cells, which can be integrated in the membrane 104. Other examples of suitable power sources include primary and secondary battery systems.

It is appreciated that the system 100 can be utilized for other applications such as water movement monitoring, chemical monitoring, and the like.

Figure 2:
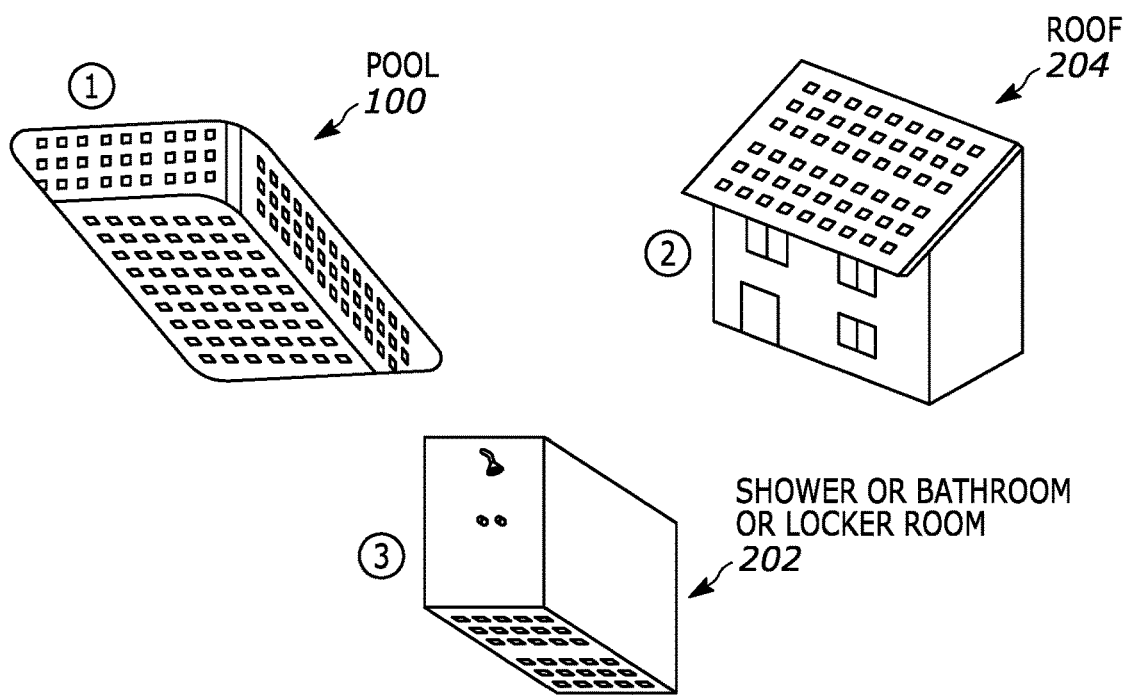
FIG. 2 is a diagram illustrating examples of suitable applications for the membrane 104 in accordance with one or more embodiments.

FIG. 2 is a diagram illustrating examples of suitable applications for the membrane 104 in accordance with one or more embodiments.

The system 100 is shown where the membrane 104 is used for a pool leak detection system.

A system 204 is shown where the membrane 104 is used for a roof leak detection system.

A system 202 is shown where the membrane 104 is used for a shower leak detection system.

Figure 3:
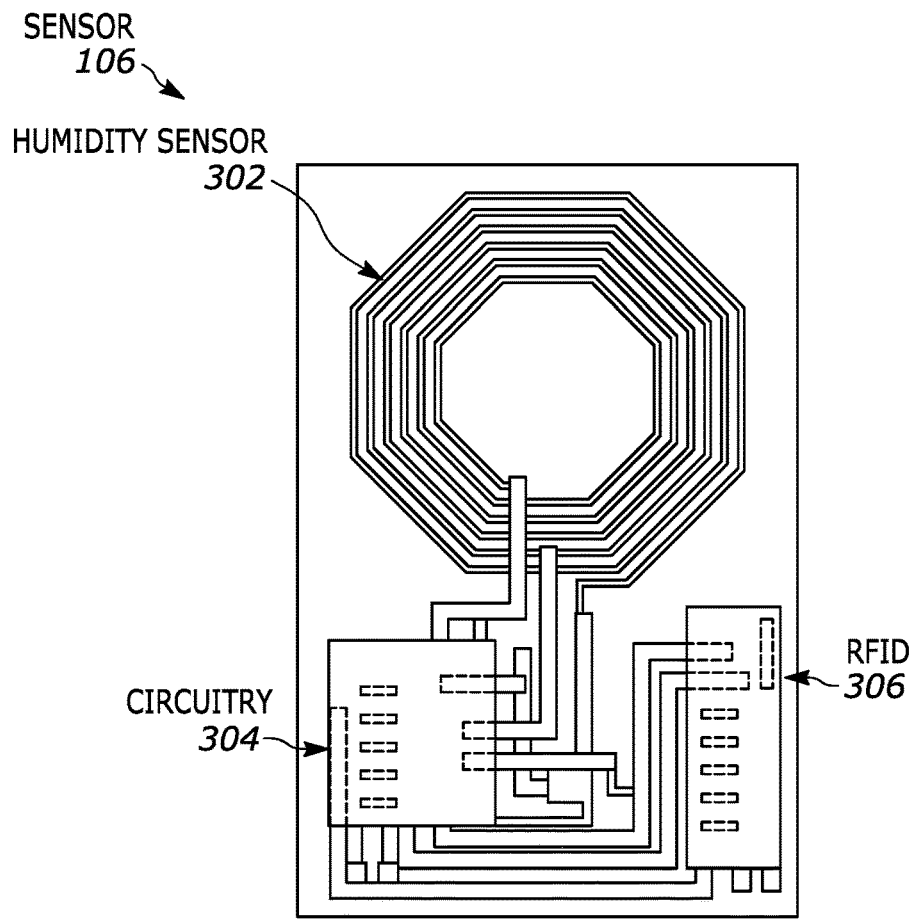
FIG. 3 is a diagram showing an example of a sensor 106 that can be used in accordance with one or more embodiments.

FIG. 3 is a diagram showing an example of a sensor 106 that can be used in accordance with one or more embodiments. It is appreciated that other suitable sensors can be used.

The sensor 106 can be used with the membrane 104, shown above. Here, the sensor 106 includes a humidity sensor 302, sensor circuitry 304 and RFID circuitry 306.

The humidity sensor 302 is configured to generate a capacitance measurement or other suitable membrane, which can be converted to a relative humidity value.

The RFID circuitry 306 is configured to transmit measurements and other information using NFC and RFID. The RFID circuitry 306 can include an RFID tag.

The sensor circuitry 304 is configured to control the sensor 302 and the RFID 306.

In another example, the circuitry 306 is configured to transmit measurements using other suitable protocols including, but not limited to, WiFi, Bluetooth, IoT, 4G, 5G, and the like. Further, it is appreciated that the circuitry 306 can utilize wired and/or wireless communications.

Figure 4:
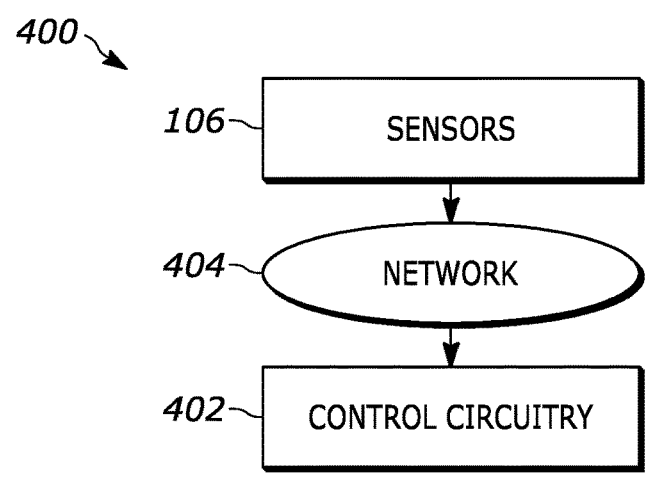
FIG. 4 is a diagram illustrating a leak detection system 400 in accordance with one or more embodiments.

FIG. 4 is a diagram illustrating a leak detection system 400 in accordance with one or more embodiments. The system 400 can be used as/with the system 100.

The system 400 includes a plurality of sensors 106, a network 104, and control circuitry 402.

The plurality of sensors 106 typically included humidity sensors and can also include temperature sensors, stress/strain sensors, magnetic sensors, and the like.

The control circuit 402 is configured to receive a plurality of membrane measurements from the sensors 106. The control circuit 402 is configured to determine a plurality of humidity readings based on the plurality of capacitance measurements. The control circuit 402 is configured to identify one or more leaks based on the plurality of humidity readings.

The network 404 facilitates communication between the sensors 106 and the control circuitry 402. The network 404 can be wired and/or wireless.

In one example, wires and/or conductive paths are present in the membrane 104 and are utilized to provide power and/or transfer information between the sensors 106 and the control circuit 402.

Figure 5:
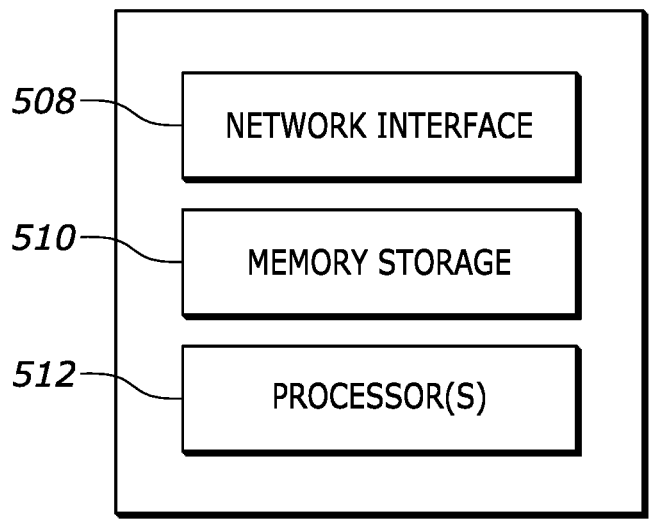
FIG. 5 is a more detailed view of the control circuit 402 in accordance with one or more embodiments.

FIG. 5 is a more detailed view of the control circuit 402 in accordance with one or more embodiments. The circuit 402 is provided for illustrative purposes and it is appreciated that suitable variations are contemplated.

The control circuit 402 includes a network interface 508, a memory storage 510 and processors 512.

The network interface 508 passes information to a transceiver and/or the like to provide information and receive information, such as sensor measurements.

The memory storage 510 is configured to store humidity measurements, threshold values, and the like.

The one or more processors 512 are configured to perform the functionality of the control circuit 402.

Figure 6:
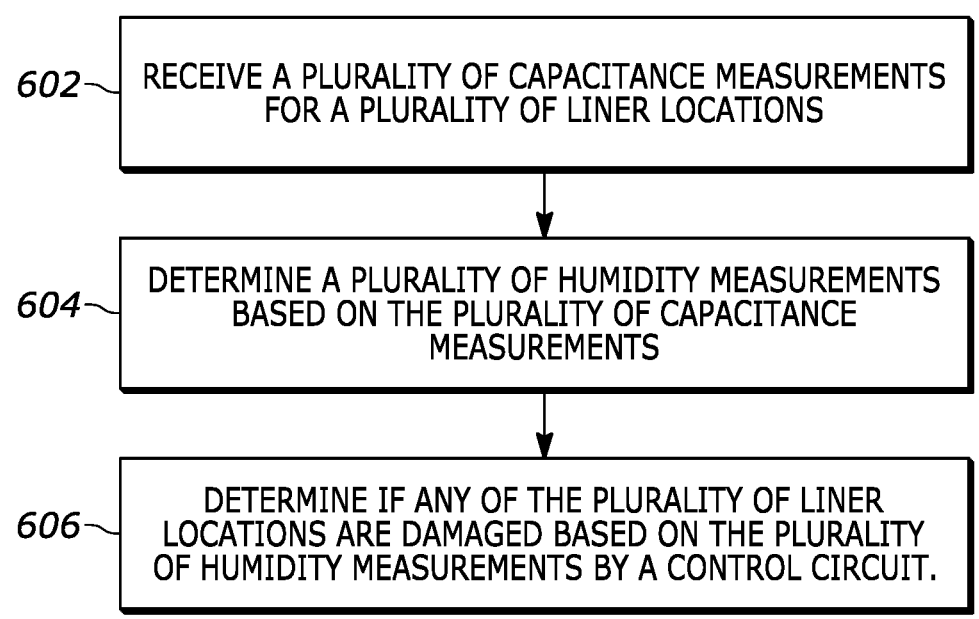
FIG. 6 is a flow diagram illustrating a method 600 of detecting leaks for a membrane in accordance with one or more embodiments.

FIG. 6 is a flow diagram illustrating a method 600 of detecting leaks for a membrane in accordance with one or more embodiments.

A control circuit 402 receives a plurality of membrane measurements for a plurality of membrane locations from a plurality of sensors 106 located on a membrane 104 at 602.

The control circuit determines a plurality of humidity measurements based on the plurality of membrane measurements at 604.

The control circuit determines if any of the plurality of membrane locations are damaged based on the plurality of humidity measurements at 606.

In one example, determining if any of the plurality of membrane locations are damaged comprises comparing the plurality of humidity measurements with one or more threshold values.

In another example, the control circuit 406 signals an alarm based on detection of a leak.

It is noted that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various illustrative logics, logical blocks, modules, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration. Additionally, at least one processor can comprise one or more modules operable to perform one or more of the s and/or actions described herein.

For a software implementation, techniques described herein can be implemented with modules (e.g., procedures, functions, and so on) that perform functions described herein. Software codes can be stored in memory units and executed by processors. Memory unit can be implemented within processor or external to processor, in which case memory unit can be communicatively coupled to processor through various means as is known in the art. Further, at least one processor can include one or more modules operable to perform functions described herein.

Various examples of one or more embodiments/aspects are described below.

One general aspect includes a leak detection system for a membrane. The leak detection system also includes a non-permeable membrane. The leak detection system also includes a plurality of printed sensors configured to obtain membrane measurements at a plurality of locations of the membrane. The leak detection system also includes a control circuit configured to: receive a plurality of membrane measurements for the plurality of locations, and compare obtained measurements with a threshold value, determine a plurality of humidity readings based on the plurality of membrane measurements, and determine if damage is present at the plurality of locations based on the plurality of humidity readings.

Implementations may include one or more of the following features. The system where the membrane includes a fabric may include of one or more of polyester, polyamide, cotton, and cotton/polyester blends. The membrane layer is attached to one or more other layers. The membrane layer is may include of poly vinyl chloride (PVC), ethylene propylene diene terpolymer (EPDM), and/or thermoplastic polyolefin (TPO). The membrane may include an elastomeric material. Plurality of printed sensors are flexible electronics. The plurality of printed sensors include radio frequency identification (RFID) tags. The plurality of printed sensors are further configured to measure temperature. The plurality of printed sensors are configured to wirelessly transmit information to the control unit. The system may include a photovoltaic cell configured to provide power to the plurality of printed sensors. The plurality of printed sensors are attached to a surface of the membrane and covered by an at least semipermeable cover layer. The plurality of printed sensors are embedded in the membrane. The control unit is further configured to transmit one or more damaged locations based on the plurality of humidity readings. The membrane is part of an outer surface of a pool membrane or pool liner. The membrane is part of an outer surface of a roof. Implementations of the described techniques may include hardware, a method or process, or computer software on a computer-accessible medium.

One general aspect includes a control circuit of a leak detection system for a membrane. The control circuit also includes a memory storage. The control circuit also includes one or more processors configured to: receive a plurality of membrane measurements for the plurality of locations, determine a plurality of humidity readings based on the plurality of membrane measurements, and determine if damage is present at the plurality of locations based on the plurality of humidity readings.

Implementations may include one or more of the following features. The control circuit may include a network interface configured to receive the plurality of capacitance measurements via a wireless transceiver. The one or more processors are configured to identify a damaged location of the membrane based on the plurality of humidity readings. Implementations of the described techniques may include hardware, a method or process, or computer software on a computer-accessible medium.

One general aspect includes a method of operating a leak detection system. The method of operating also includes receiving a plurality of membrane measurements for a plurality of membrane locations, the plurality of membrane measurements include a plurality of capacitance measurements. The method of operating also includes determining a plurality of humidity measurements based on the plurality of membrane measurements. The method of operating also includes determining if any of the plurality of membrane locations are damaged based on the plurality of humidity measurements by a control circuit.

Implementations may include one or more of the following features. The method where determining if any of the plurality of membrane locations are damaged may include comparing the plurality of humidity measurements with one or more threshold values. Implementations of the described techniques may include hardware, a method or process, or computer software on a computer-accessible medium.

Techniques described herein can be used for various wireless communication systems such as CDMA, TDMA, FDMA, OFDMA, SC-FDMA and other systems. The terms "system" and "network" are often used interchangeably. A CDMA system can implement a radio technology such as Universal Terrestrial Radio Access (UTRA), CDMA1800, etc. UTRA includes Wideband-CDMA (W-CDMA) and other variants of CDMA. Further, CDMA1800 covers IS-1800, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.18, Flash-OFDM, etc. UTRA and E-UTRA are part of Universal Mobile Telecommunication System (UMTS). 3GPP Long Term Evolution (LTE) is a release of UMTS that uses E-UTRA, which employs OFDMA on downlink and SC-FDMA on uplink. UTRA, E-UTRA, UMTS, LTE and GSM are described in documents from an organization named "3rd Generation Partnership Project" (3GPP). Additionally, CDMA1800 and UMB are described in documents from an organization named "3rd Generation Partnership Project 2" (3GPP2). The techniques can also be used with new radio (NR) 5G, also from the 3GPP organization. Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA), which utilizes single carrier modulation and frequency domain equalization is a technique that can be utilized with the disclosed aspects. SC-FDMA has similar performance and essentially a similar overall complexity as those of OFDMA system. SC-FDMA signal has lower peak-to-average power ratio (PAPR) because of its inherent single carrier structure. SC-FDMA can be utilized in uplink communications where lower PAPR can benefit a mobile terminal in terms of transmit power efficiency.

Moreover, various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data. Additionally, a computer program product can include a computer readable medium having one or more instructions or codes operable to cause a computer to perform functions described herein.

Communications media embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

It is appreciated that the various aspects/embodiments can utilize short-range communication, such as near field communication (NFC). The NFC standard related to the radio-frequency identification (RFID) standard describes a communication protocol for transmitting information between two devices.

An RFID tag can be used, which includes a radio transponder; a radio receiver and transmitter. When triggered by an electromagnetic interrogation pulse from a nearby RFID reader device, the RFID tag transmits digital data, such as an identifying number, back to the reader. Passive RFID tags are powered by energy from the RFID reader's interrogating radio waves. Active RFID tags are powered by a battery and thus can be read at a greater range from the RFID reader; up to hundreds of meters. Unlike a barcode, the tag doesn't need to be within the line of sight of the reader, so it may be embedded in the tracked object. RFID is one method of automatic identification and data capture (AIDC). It is appreciated that the various aspects/embodiments can utilize RFID tags and/or other techniques of AIDC.

Further, the actions of a method or algorithm described in connection with aspects disclosed herein can be embodied directly in hardware, in a software module executed by a processor, or a combination thereof. A software module can reside in RAM memory, flash memory, ROM memory, EPROM memory, EEPROM memory, registers, a hard disk, a removable disk, a CD-ROM, or any other form of storage medium known in the art. An exemplary storage medium can be coupled to processor, such that processor can read information from, and write information to, storage medium. In the alternative, storage medium can be integral to processor. Further, in some aspects, processor and storage medium can reside in an ASIC. Additionally, ASIC can reside in a user terminal. In the alternative, processor and storage medium can reside as discrete components in a user terminal. Additionally, in some aspects, the s and/or actions of a method or algorithm can reside as one or any combination or set of codes and/or instructions on a machine-readable medium and/or computer readable medium, which can be incorporated into a computer program product.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

As it employed in the subject specification, the term "processor" can refer to substantially any computing processing unit or device including, but not limited to including, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit, a digital signal processor, a field programmable gate array, a programmable logic controller, a complex programmable logic device, a discrete gate or transistor logic, discrete hardware components, or any combination thereof designed to perform the functions and/or processes described herein. Processors can exploit nano-scale architectures such as, but not limited to, molecular and quantum-dot based transistors, switches and gates, in order to optimize space usage or enhance performance of mobile devices. A processor may also be implemented as a combination of computing processing units.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner", "adjacent", "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

It should be added that 'having' does not exclude other elements or steps and 'one' or 'one' does not exclude a multitude. It should also be noted that characteristics described with reference to one of the above examples of execution can also be used in combination with other characteristics of other examples of execution described above. Reference signs in the claims are not to be regarded as a restriction.

Various examples are provided, however it is appreciated that suitable variations are contemplated.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus, system, and the like to perform the actions.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A leak detection system for a membrane, the system comprising:
   a non-permeable pool membrane that is flexible;
   a plurality of printed sensors configured to obtain membrane measurements at a plurality of locations of the membrane;
   the plurality of sensors comprise humidity sensors, temperature sensors and strain sensors;
   the plurality of sensors include one or more location identification tags;
   conductive wires formed in the membrane and connected to the plurality of sensors; and
   the sensors are arranged as a grid;
   a control circuit connected to the conductive wires and configured to:
      receive a plurality of membrane measurements for the plurality of locations; and
      compare obtained measurements with a threshold value; determine a plurality of humidity readings based on the plurality of membrane measurements; and
      determine if damage is present at the plurality of locations based on the plurality of humidity readings.

2. The system of claim 1, wherein the membrane includes a fabric comprised of one or more of polyester, polyamide, cotton, and cotton/polyester blends.

3. The system of claim 1, wherein the membrane layer is attached to one or more other layers.

4. The system of claim 1, wherein the membrane layer is comprised of poly vinyl chloride (PVC), ethylene propylene diene terpolymer (EPDM), and/or Thermoplastic Polyolefin (TPO).

5. The system of claim 1, wherein the membrane comprises an elastomeric material.

6. The system of claim 1, wherein plurality of printed sensors are flexible electronics.

7. The system of claim 1, wherein the plurality of printed sensors include radio frequency identification (RFID) tags.

8. The system of claim 1, wherein the plurality of printed sensors are further configured to measure temperature.

9. The system of claim 1, wherein the plurality of printed sensors are configured to wirelessly transmit information to the control unit.

10. The system of claim 1, further comprising a photovoltaic cell configured to provide power to the plurality of printed sensors.

11. The system of claim 1, wherein the plurality of printed sensors are embedded in the membrane.

12. The system of claim 1, wherein the control unit is further configured to transmit one or more damaged locations based on the plurality of humidity readings.

13. The system of claim 1, wherein the membrane is part of an outer surface of a pool membrane.

14. The system of claim 1, wherein the membrane is part of an outer surface of a roof.

* * * * *